United States Patent [19]

Kydonieus et al.

[11] 3,929,852

[45] Dec. 30, 1975

[54] PROCESS FOR PREPARING α,β-UNSATURATED THIOLESTERS

[75] Inventors: Nicholas Kydonieus, Wayne; Stanley Robert Sandler, Springfield, both of Pa.

[73] Assignee: Pennwalt Corporation, Philadelphia, Pa.

[22] Filed: May 1, 1974

[21] Appl. No.: 465,788

[52] U.S. Cl. ...... 260/455 R; 260/347.2; 260/544 F; 260/544 L; 260/544 M; 260/544 Y; 260/546; 260/609 R; 260/609 D
[51] Int. Cl.² .................................. C07C 153/11
[58] Field of Search ............................ 260/455 R

[56] References Cited
UNITED STATES PATENTS

| | | | |
|---|---|---|---|
| 2,445,142 | 7/1948 | Himel | 260/455 R |
| 2,550,141 | 4/1951 | Documani et al. | 260/455 R |
| 3,402,194 | 9/1968 | Schleppunik | 260/455 R |
| 3,544,663 | 12/1970 | Hauptschein et al. | 260/455 R |

OTHER PUBLICATIONS

J. Org. Chem. 29, pp. 1910–1914 (1964).
J. Amer. Chem. Soc. 73, pp. 2857–2858 (1951).
Mukaiyama et al., Cur. Abstract of Chem. 50, Abstract No. 205436 (1973).

*Primary Examiner*—Lewis Gotts
*Assistant Examiner*—D. R. Phillips
*Attorney, Agent, or Firm*—David Edwards

[57] ABSTRACT

A process for preparing an α,β-unsaturated thiolester via the reaction of an α,β-unsaturated carboxylic acid halide or anhydride with a mercaptan in the presence of a catalytically effective amount of certain halides, sulfates, and oxides of selected elements.

11 Claims, No Drawings

3,929,852

PROCESS FOR PREPARING α,β-UNSATURATED THIOLESTERS

This invention relates to an improved process for synthesizing α,β-unsaturated thiolesters. More particularly, this invention concerns a process for preparing an α,β-unsaturated thiolester via the reaction of an α,β-unsaturated carboxylic acid halide or anhydride with a mercaptan in the presence of a catalytically effective amount of certain halides, sulfates, and oxides of selected elements. The use of the catalysts embodied in this invention results in a relatively quick reaction to produce the thiolester in higher yield, with alleviation of by-product and waste-disposal problems. The good results and advantages of the process are unexpected in view of the teachings of the prior art, summarized below.

Himel, U.S. Pat. No. 2,445,142, discloses the reaction of anhydrides of saturated organic monobasic acids with tertiary aliphatic mercaptans in the presence of zinc chloride to yield thiolesters of the mercaptan, and Bachmann and Carlson, J. Am. Chem. Soc., 73, p. 2857 (1951), disclose the reaction of thiophenol with acetyl chloride (a saturated organic acid chloride) in the presence of aluminum chloride to obtain the thiolester. However, Kendall, U.S. Pat. No. 2,389,153, teaches that in the reaction of acrylyl chloride with ethyl mercaptan in the presence of zinc chloride, the product is not ethyl thiolacrylate, but is trithioorthoacrylate. Furthermore, when Schleppnik and Zienty, J. Org. Chem., 29, p. 1910 (1964), reacted acrylyl chloride (an α,β-unsaturated acid chloride) with ethyl mercaptan at elevated temperature (50°C.) in the presence of zinc chloride as the catalyst and cuprous chloride as the polymerization inhibitor, a complex mixture was obtained containing only a trace of the desired thiolacrylate. In another experiment without catalyst they reacted ethyl mercaptan with crotonyl chloride (an α,β-unsaturated acid chloride) at higher temperatures (50°–150° C.) and obtained as much undesired addition product as thiolester. Still further, Mukaiyama et al., Chem. Lett., 4, p. 355 (1973) react α,β-unsaturated carbonyl esters with ethyl mercaptan in the presence of TiCl$_4$ and obtain addition products in good yield rather than the unsaturated thiolesters.

The difficulty in preparing α,β-unsaturated thiolesters is further shown by the work of Zienty, Vineyard and Schleppnik, J. Org. Chem. 27, p. 3140 (1962), who earlier had investigated the base-catalyzed reaction of thiols (mercaptans) with α,β-unsaturated carboxylic acid anhydrides. No ester formation was encountered, even under the preferred conditions. Sumrell, Ham and Hornbaker, J. Am. Chem. Soc., 80, p. 2509 (1958) investigated the base-catalyzed reaction of sodium mercaptides (of benzenethiol and alkyl mercaptans) with acrylyl or methacrylyl chloride, and frequently obtained much of the addition product (reaction at the double bond) rather than the desired thiolester. Finally, Corey and Beames, J. Am. Chem. Soc., 95, p. 5829 (1973) teach a method of preparing thiolesters which requires the use of the highly pyrophoric reagent trimethylaluminum.

Hauptschein et al., U.S. Pat. No. 3,544,663, teach that certain fluorinated, α,β-unsaturated thiolesters may be prepared by reaction of methacrylyl chloride with the appropriate mercaptan in the presence of pyridine or triethylamine. For adaption to commercial production, this method has the serious disadvantage of requiring the separation and the disposal of large volumes of amine hydrochloride, steps which also cause yield losses. Furthermore, the basic amine causes addition of the mercaptan across the double bond to form high boilers, further lowering the yield and adding to the separation problems. The resulting side-reaction product may be present in 10% or more yield depending on the reaction conditions and the particular α,β-unsaturated acid chloride (also see Sumrell, Ham and Hornbaker, ibid).

In accordance with the present invention, an α,β-unsaturated thiolester is prepared by reacting an α,β-unsaturated carboxylic acid halide or anhydride with a mercaptan in contact with a catalytically effective amount of a compound selected from the class consisting of the chlorides and bromides of iron, tin, aluminum, boron, titanium, vanadium, zirconium, manganese, chromium, antimony, indium, tantalum, tellurium, bismuth, mercury, phosphorous, and silicon; the fluorides of boron and antimony; the sulfates of iron; and the oxides of iron and tin.

In general, the reaction can be carried out at temperatures in the range of about 10°C. to 250°C., but preferably at from about 10°C. to 100°C., desirably in the liquid phase in admixture with a solvent, or with an excess of the α,β-unsaturated carboxylic acid halide or anhydride reactant serving also as a solvent. The molar ratio of the acid reactant to the mercaptan reactant can vary over a wide range, for example, from about 1 : 1 to about 30 : 1, preferably from about 1 : 1 to about 7 : 1. Suitable solvents, when used, are typified by halocarbons such as methylene chloride, chloroform, carbon tetrachloride, tetrachloroethane, trichlorofluoromethane, and trifluorotrichloroethane; and ethers such as bis dichloroethyl ether and bis trichloroethyl ether.

The catalyst concentration can vary over a wide range, but will in general be on the order of from about 0.001 to 1 mole per mole of mercaptan reactant, usually in the range of about 0.01 to 0.25 mole per mole of mercaptan. The most preferred catalysts, from the standpoint of obtaining good results at moderate temperatures, e.g., about 10°–50°C., and in the presence of solvents, are FeCl$_3$ and FeBr$_3$. In the absence of solvent, but using an excess of the carboxylic acid halide or anhydride reactant, the preferred catalysts are FeCl$_3$, FeBr$_3$, and SnCl$_4$. In addition to these said preferred species, it has been found that at elevated temperatures (i.e., 50°–250°C.), AlCl$_3$, Fe$_2$O$_3$, SnO and Fe$_2$(SO$_4$)$_3$ are particularly effective catalysts. In some cases it may be desirably convenient to employ the catalyst as a deposit on an inert solid carrier, for example, alumina or silica or clay.

The α,β-unsaturated carboxylic acid reactant can be a halide, that is an acid chloride, fluoride, or bromide, preferably a chloride, or the anhydride of the acid having from 1 to 30 carbon atoms, of linear, branched or cyclic configuration. The acid halides can be prepared in situ in the reaction medium prior to introduction of the mercaptan and catalyst, by reacting the unsaturated carboxylic reactant with a halogenating agent such as thionyl chloride or oxalyl chloride. Typical of the unsaturated carboxylic acid reactant precursors of the thiolesters produced herein are the following.

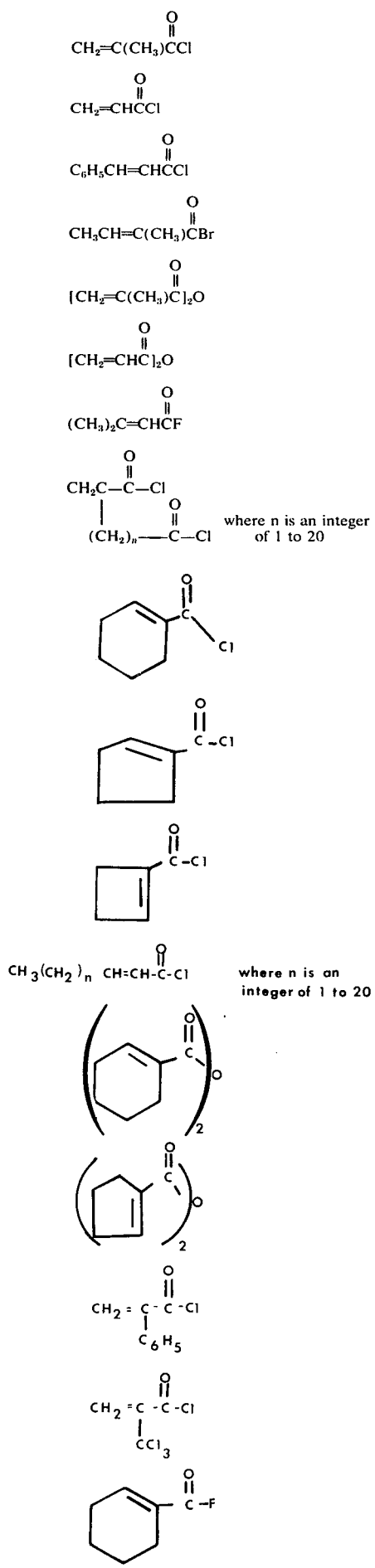
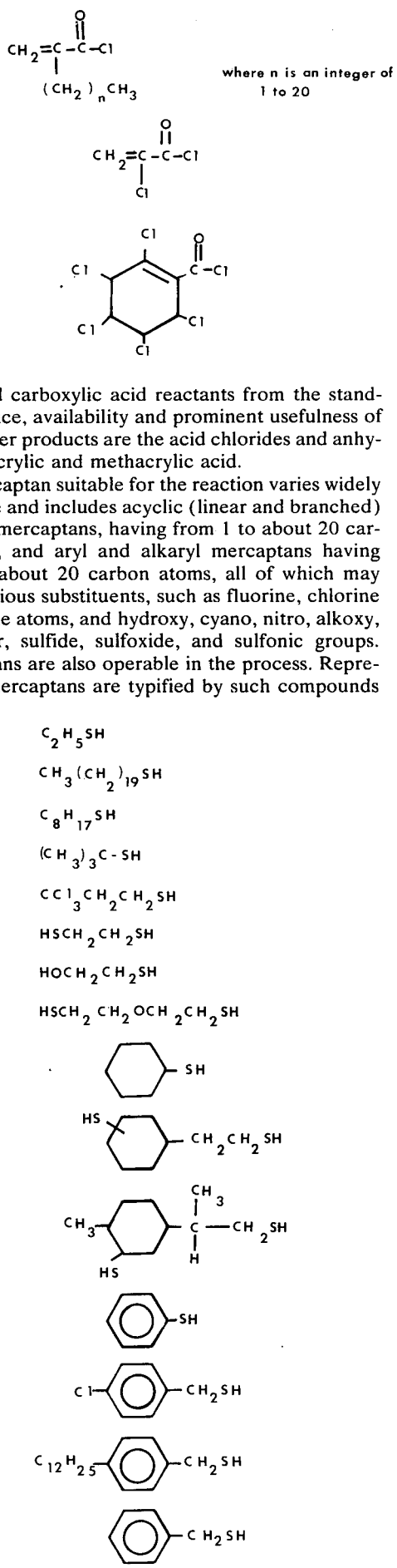

Preferred carboxylic acid reactants from the standpoint of price, availability and prominent usefulness of the thiolester products are the acid chlorides and anhydrides of acrylic and methacrylic acid.

The mercaptan suitable for the reaction varies widely in structure and includes acyclic (linear and branched) and cyclic mercaptans, having from 1 to about 20 carbon atoms, and aryl and alkaryl mercaptans having from 6 to about 20 carbon atoms, all of which may contain various substituents, such as fluorine, chlorine and bromine atoms, and hydroxy, cyano, nitro, alkoxy, ester, ether, sulfide, sulfoxide, and sulfonic groups. Dimercaptans are also operable in the process. Representative mercaptans are typified by such compounds as

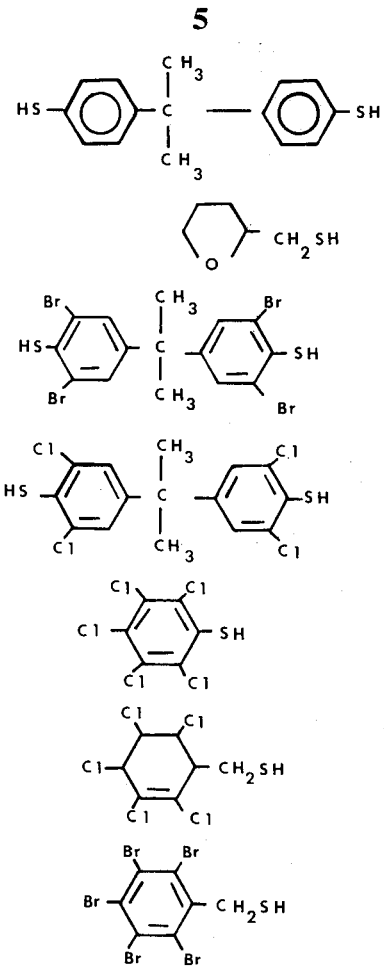

A preferred group of mercaptan reactants are the fluorinated alkyl thiols, for example, of the structures $R_fCH_2SH$
$R_fCH_2CH_2SH$
$R_f(CH_2)_nSH$ where $n$ is 3 to 10
$R_fSO_2N(R)(CH_2)_mSH$ where $m$ is 2 to 6
$R_fCON(R)(CH_2)_mSH$ where $m$ is 2 to 6
$R_fCH_2CH_2OCH_2CH_2SH$
$R_fCH_2CH_2SCH_2CH_2SH$ where R is hydrogen or lower alkyl, and $R_f$ is a perfluoroalkyl, monochloroperfluoroalkyl or perfluoroisoalkoxyalkyl group having from 1 to 20 carbon atoms, for example, $F(CF_2)_n$, where $n$ is 1 to 20, e.g., $C_6F_{13}$, $C_8F_{17}$, $C_9F_{19}$,
$(CF_3)_2CF(CF_2)_m$ where $m$ is 1 to 17
$(CF_2Cl)(CF_3)CF(CF_2)_m$ where $m$ is 1 to 17, e.g.,
   $(CF_3)_2CF(CF_2)_2$
$(CF_3)_2CF(CF_2)_4$
$(CF_3)_2CF(CF_2)_8$
$(CF_3)_2CF(CF_2)_{10}$
$(CF_3)_2CFO(CF_2)_m$ where $m$ is 1 to 17

Particularly preferred mercaptans from this group are those represented by $R_f(CH_2)_ySH$ where $y$ is an integer of 1 to 10, preferably 2 or 3, and $R_f$ has 6 to 14 carbon atoms. Especially preferred mercaptans are those where $R_f$ is $(CF_3)_2CF(CF_2)_m$ where $m$ is 3 to 10. Other useful mercaptans are those derived from the tetrafluoroethylene oligmers described in British Pat. No. 1,082,127 and mercaptans derived from polyperfluoropropyleneoxides derivatives such as described in U.S. Pat. No. 2,912,018.

The unsaturated thiolesters prepared according to the method of this invention are polymerizable by means well known to those skilled in the art into polymeric compositions useful as coatings, adhesives, release agent, lubricant additives, plasticizers and flame retardants. The fluorine containing species are particularly useful for preparing fluorine containing polymers which impart water and oil repellent capabilities to substrates treated or modified therewith.

The following examples illustrate the process of the invention relative to the reaction of representative mercaptans with representative and preferred $\alpha,\beta$-unsaturated carboxylic acid derivatives in the presence of catalysts embodied herein.

EXAMPLE 1

A one-liter flask equipped with a stirrer, condenser, addition funnel and nitrogen atmosphere is charged with 250 g. methylene chloride, 54.0 g (0.517 mole) of methacrylyl chloride and 3.70 g. (0.0228 mole) of ferric chloride. Then 250 g. (0.472 mole) of $(CF_3)_2CF(CF_2)_6CH_2CH_2SH$ is added dropwise at 20°–25°C. over a 30-minute period, during which time HCl is evolved. The reaction mixture is washed with water containing citric acid to remove ferric salts, etc. The product ester, having the structure

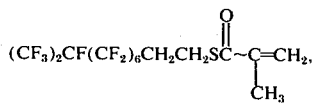

is isolated from the washed methylene chloride layer by stripping under reduced pressure to afford 277 g. (90% yield); b.p. 83°C/0.1 mm Hg. The crude product is satisfactory for most purposes without further purification since it contains less than 1% by weight of high boilers. The infrared spectrum is identical to a sample of the thiolester prepared earlier by the triethylamine route according to the technique disclosed in U.S. Pat. No. 3,544,663.

EXAMPLE 2

Using essentially the procedure of Example 1, $(CF_3)_2CF(CF_2)_4CH_2CH_2SH$ is reacted with methacrylyl chloride to produce in about the same yield the thiolester

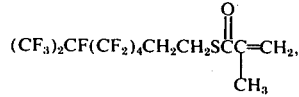

b.p. 74°C/0.3 mm Hg.

EXAMPLE 3

$(CF_3)_2CF(CF_2)_8CH_2CH_2SH$ is reacted with methacrylyl chloride following the procedure of Example 1 to produce in similar yield the thiolester

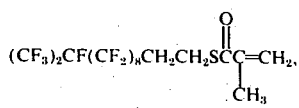

b.p. 105°C./0.1 mm Hg.

EXAMPLE 4

To an Erlenmeyer flask equipped with a magnetic stirrer and nitrogen atmosphere is added 24.3 g. (0.233 mole) of methacrylyl chloride and 0.64 g. (0.0048 mole) of aluminum chloride. Then 20.0 g. (0.0378 mole) of $(CF_3)_2CF(CF_2)_6CH_2CH_2SH$ is added over a 30 minute period while the temperature is maintained at 40°–45°C. Analysis of the reaction mixture indicates that all the mercaptan has reacted, and the desired product,

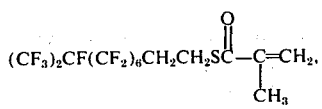

has been produced in nearly quantitative yield, contaminated by only 1% high boilers by-product.

EXAMPLE 5

To a flask equipped as in Example 1 is added 200 g. of methylene chloride, 30.8 g. (0.20 mole) of methacrylic anhydride and 2.0 g. (0.0124 mole) of ferric chloride. 106 g. (0.200 mole) of $(CF_3)_2CF(CF_2)_6CH_2CH_2SH$ is added dropwise over a 30-minute period at 35°C. Work up as in Example 1 gives a 77% yield of thiolester product

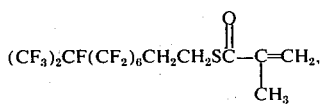

containing only about 0.6 weight percent boilers contamination.

EXAMPLE 6

To a 1-liter stirred stainless steel reactor, equipped with a steam jacket, turbine agitator (100 rpm), and reflux condenser with return line connected to a controlled vacuum source, is added 0.40 g. (0.00247 mole) ferric chloride, 0.20 g N,N-diphenyl-p-phenylenediamine (polymerization inhibitor) and 530 g. (5.07 mole) of methacrylyl chloride. The reactor pressure is controlled at 20 inches mercury of vacuum and steam added to the jacket to give a 120°F product, temperature. When reflux begins, 530 g. (1.0 mole) of $(CF_3)_2CF(CF_2)_6CH_2CH_2SH$ is added over a period of 30 minutes. After this addition the reflux line is diverted from the reactor to a receiver and the reactor temperature raised to 320°F. as rapidly as possible to remove the excess methacrylyl chloride by distillation, after which the reactor is quickly cooled, and the product is removed and worked up essentially as described in Example 1 to give the thiolmethacrylate product,

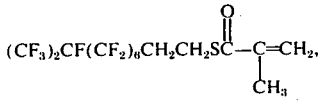

in 95% yield, which is about 97% pure and contains less than 1% high boilers.

EXAMPLE 7

To a continuous 8-stage reactor equipped with feed tanks, demister column, recycle gear-pump, evaporator, condenser, vacuum gauge and regulator is charged 1500 g. (14.4 mole) methacrylyl chloride. The evaporator jacket is heated with 80 psi steam, and cooling water is fed to the condenser shell. The vacuum in the system is set at 25 inches mercury and the recycle pump set to pump 30 lbs/hr. methacrylyl chloride. Stannic chloride catalyst is metered into the first stage of the reactor at the rate of 45 g./hr. and $C_9F_{19}CH_2CH_2SH$ feed thereto regulated at 5 lb./hr. In approximately 6 minutes product starts to collect in the product receiver. The methacrylyl chloride-product mixture is continuously passed through the evaporator and the unreacted material stripped and recycled. The product stream contains about 83% of desired product. Removal of excess methacrylyl chloride under vacuum, followed by work-up essentially as in Example 1 gives the thiolester product

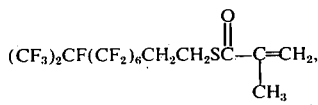

97% pure with less than 1% by weight high boilers.

EXAMPLE 8

To a 1-liter 3-necked round bottom flask equipped with a mechanical stirrer, addition funnel, distillation head and nitrogen inlet-outlet tube is added 132 g. (1.09 mole) of thionyl chloride, 0.1 g. cuprous chloride and 0.5 g. dimethylformamide (DMF). Then 86 g. (1.0 mole) of methacrylic acid is added over a 1 hour period with resultant hydrogen chloride and sulfur dioxide evolution. Then the temperature is quickly raised to 90°C. and a forecut taken between 90°–98°C. The reaction mixture is quickly cooled, and 455 g. of methylene chloride added, followed by 4.32 g. (0.0266 mole) of ferric chloride. Then over a thirty-minute period 455 g. (0.860 mole) of $C_9F_{19}CH_2CH_2SH$ is added, causing hydrogen chloride to be evolved. A small nitrogen stream is kept over the reaction mixture to help remove the hydrogen chloride. The reaction product is worked up essentially as described in Example 1, and the product thiolester

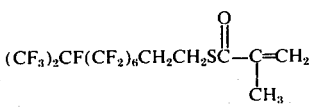

is recovered in 96% yield. Similar results are obtained when N methyl-2-pyrrolidone, hexamethylphosphoramide, triethylamine or pyridine is substituted for DMF in the reaction to prepare the acid chloride.

EXAMPLE 9

To an Erlenmeyer flask equipped with a magnetic stirrer and nitrogen atmosphere is added 4.3 g. (0.0412 mole) of crotonyl chloride, 20 g. methylene chloride and 0.19 g. (0.00117 mole) of ferric chloride. Then over a 30-minute period 20 g. (0.0378 mole) of $C_9F_{19}CH_2CH_2SH$ is added. Hydrogen chloride is continuously evolved during the reaction. After the addition, the reaction mixture is worked up as in Example 1 to give 20.5 g. (88.7% yield) of the product,

$n_D^{25}$ 1.3740.

Analysis: Calcd. for $C_{15}F_{19}H_9SO$: C, 30.50; H, 1.50; F, 60.40; S, 5.36% Found: C, 30.0; H, 1.8; F, 59.5; S, 5.2%

EXAMPLE 10

To an Erlenmeyer flask equipped with a magnetic stirrer are added under a nitrogen atmosphere 4.1 g. (0.0412 mole) of acrylyl chloride, 20 g. methylene chloride and 0.19 g. (0.00117 mole) of ferric chloride. Then over a 30-minute period 20 g. (0.0378 mole) of $C_9F_{19}CH_2CH_2SH$ is added. The reaction is carried out at 10°–25°C. The yield of product ester,

is 52%, b.p. 94°C./0.8 mm. Hg.

Analysis: Calcd. for $C_{14}F_{19}H_7SO$: C, 28.77; H, 1.20; F, 61.82; S, 5.48% Found: C, 28.9; H, 1.3; F, 64.5; S, 5.3%.

Ommission of the methylene chloride solvent in favor of use of acrylyl chloride in 500% excess gives a comparable yield of ester product.

Substituting zinc chloride for the ferric chloride catalyst in the preparation gives only an 11% yield of ester product.

EXAMPLES 11–13

In these examples, using the procedure of Example 1, methacrylyl chloride (41.2 mmole) is reacted at 25°C for 5 minutes with octyl mercaptan (37.9 mmole) in admixture with 20 g. methylene chloride solvent and 2.72 mmole of a metal chloride as a catalyst. The results of the preparations, including the yields of the desired ester product, n-octyl thiolmethacrylate,

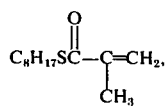

are summarized below:

| Example No. | Catalyst | Yield of Ester |
|---|---|---|
| 11 | $FeCl_3$ | 51% |
| 12 | $SnCl_4$ | 49% |
| 13 | $ZnCl_2$ | 33% |

EXAMPLE 14

Using the technique of Examples 11–13, methacrylyl chloride (238 mmole) is reacted with ethyl mercaptan (37 mmole) in the presence of 4.31 mmole $FeCl_3$ as catalyst to prepare ethyl thiolmethacrylate (82% yield) containing only 2.4% high boilers.

EXAMPLE 15

Using the technique of Examples 11–13, methacrylyl chloride (238 mmole) is reacted with t-butyl mercaptan (37 mmole) in the presence of 4.06 mmole $FeCl_3$ to product t-butyl thiolmethacrylate (61% yield) containing only 3.6% high boilers.

EXAMPLE 16

$SnCl_4$ (4.4 mmole) is substituted for the $FeCl_3$ in the process of Example 15. The yield of the t-butyl thiolmethacrylate is 66%; high boilers contamination therein is only 3.3%.

EXAMPLE 17

Using the procedure of Examples 11–13, methacrylyl chloride (240 mmole) is reacted with isobutyl mercaptan (36 mmole) in the presence of 4.06 mmole $FeCl_3$.

The yield of isobutyl thiolmethacrylate is 78%; high boilers content is only 1.7%.

EXAMPLE 18

To a flask equipped as in Example 1 are added 250 g. of methylene chloride, 54.0 g. (0.517 mole) of methacrylyl chloride, and 3.70 g. (0.0228 mole) of ferric chloride. Then 253 g. (0.472 mole) of $(CF_2Cl)CF_3CF(CF_2)_6CH_2CH_2SH$ is added dropwise at 20°–25°C. over a 30-minute period, during which time HCl is evolved. The reaction is terminated by adding methanol and removing residual iron with an ion exchange resin ("Amberlite IRA-900" -Rohm & Haas Co.). The solvent is stripped off under reduced pressure to afford a high yield of product ester,

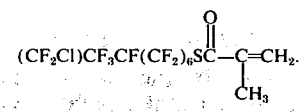

EXAMPLE 19

To a flask equipped as described in Example 1 are charged 250 g. methylene chloride, 54.0 g. (0.517 mole) of methacrylyl chloride and 3.70g (0.228 mole) of ferric chloride. Then 180 g. (0.472 mole) of $F(CF_2)_6CH_2CH_2SH$ is added dropwise at 20°–25°C. over a 1/2 hr. period, during which time HCl is evolved. The product is isolated as described in Example 1 to afford a high yield of product ester,

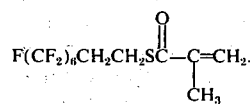

EXAMPLE 20

Using the procedure of Example 1 methacrylyl chloride (0.24 mole) is reacted with the mercaptan $(CF_3)_2CF(CF_2)_6CH_2CH_2SH$ (0.038 mole) at 45°C., the catalyst being $Fe_2(SO_4)_3 \cdot 3H_2O$ (0.0022 mole). There is obtained a 90% yield of the product ester,

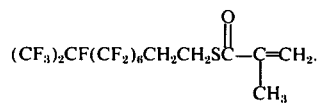

EXAMPLE 21

The procedure of Example 20 is followed except that a like amount of SnO is substituted for the ferric sulfate as catalyst. The yield of ester is again 90%.

EXAMPLE 22

Following the procedure of Example 20, 4.8 moles of methacrylyl chloride is reacted at 50°C. with 1 mole of the mercaptan in the presence of 0.0066 mole of $Fe_2O_3$ as catalyst. The yield of the ester product is 91%.

EXAMPLE 23

Following the procedure of Example 20, 0.041 mole of methacrylyl chloride is reacted at 25°C. with 0.038 mole of the mercaptan in the presence of 0.0012 mole $Fe_2O_3$ in admixture with 20 g. methylene chloride solvent. The yield of the ester product is 60%.

EXAMPLES 24–27

The procedure of Example 4 is essentially followed, carrying out the reactions at 25°C. using the following catalysts.

| Example No. | Catalyst | Mole Ratio of Methacrylyl chloride to $C_9F_{19}CH_2CH_2SH$ | Ratio in Product of Thiolester to High Boilers |
| --- | --- | --- | --- |
| 24 | $ZrCl_4$ | 5:1 | 32.6:1 |
| 25 | $HgCl_2$ | 5:1 | 27.3:1 |
| 26 | $SiCl_4$ | 5:1 | 42.2:1 |
| 27 | $PCl_3$ | 5:1 | 11.5:1 |

EXAMPLES 28–29

The procedure of Example 4 is essentially followed except that the catalyst is added to the mixture after the addition of the mercaptan, and the reaction temperature is 25°C.

| Example No. | Catalyst | Mole Ratio of Acid Chloride to Mercaptan | Ratio in Product of Thiolester to High Boilers |
| --- | --- | --- | --- |
| 28 | $TiCl_4$ | 5:1 | 1.92:1 |
| 29 | $CrCl_3$ | 5:1 | 8.9:1 |

We claim:

1. In the process of preparing an $\alpha,\beta$-unsaturated thiolester via the reaction of an $\alpha,\beta$-unsaturated carboxylic acid chloride, fluoride, bromide or anhydride with a mercaptan, the improvement which comprises conducting said reaction with the reactants in contact with a catalytically effective amount of compound selected from the group consisting of the chlorides and bromides of iron, tin, aluminum, boron, titanium, vanadium, zirconium, manganese, chromium, antimony, indium, tantalum, tellurium, bismuth, mercury, phosphorus, and silicon; the fluorides of boron and antimony; the sulfates of iron; and the oxides of iron and tin.

2. The process of claim 1 in which the catalyst is $FeCl_3$, $FeBr_3$ or $SnCl_4$.

3. The process of claim 2 wherein the temperature of the reaction is about 10° to 50°C.

4. The process of claim 1 in which the catalyst is $AlCl_3$, $Fe_2O_3$, SnO, or $Fe_2(SO_4)_3$ and the temperature of the reaction is within the range of 50°C. to 250°C.

5. The process of claim 1 wherein the $\alpha,\beta$-unsaturated carboxylic reactant is selected from the group consisting of acrylyl chloride, methacrylyl chloride, acrylic anhydride and methacrylic anhydride.

6. The process of claim 5 wherein the mercaptan is of the structure $R_f(CH_2)_nSH$ where n is an integer of 1 to 10 and $R_f$ is perfluoroalkyl, monochloroperfluoroalkyl or a perfluoroisoalkoxyalkyl group of 1 to 20 carbon atoms.

7. The process of claim 6 wherein n is 2 or 3 and $R_f$ contains 6 to 14 carbon atoms.

8. The process of claim 6 wherein the catalyst is $FeCl_3$, $FeBr_3$ or $SnCl_4$.

9. The process of claim 6 wherein the catalyst is $AlCl_3$, $Fe_2O_3$, SnO or $Fe_2(SO_4)_3$.

10. The process of claim 6 wherein the mercaptan is characterized in that n is 2 and $R_f$ is $(CF_3)_2CF(CF_2)_m$ where m is an integer of 3 to 10.

11. The process of claim 10 wherein the catalyst is $FeCl_3$, $FeBr_3$ or $SnCl_4$.

* * * * *